(12) United States Patent
Mikoleizig

(10) Patent No.: US 7,735,233 B2
(45) Date of Patent: Jun. 15, 2010

(54) MEASURING APPARATUS FOR HEAVY WORKPIECES AND WORKPIECE RECEIVER FOR SUCH A MEASURING APPARATUS

(75) Inventor: Günter Mikoleizig, Hückeswagen (DE)

(73) Assignee: Klingelnberg AG, Zurich (CH)

( * ) Notice: Subject to any disclaimer, the term of this patent is extended or adjusted under 35 U.S.C. 154(b) by 0 days.

(21) Appl. No.: 12/254,886

(22) Filed: Oct. 21, 2008

(65) Prior Publication Data

US 2009/0112508 A1    Apr. 30, 2009

(30) Foreign Application Priority Data

Oct. 24, 2007    (EP) .................................. 07119171

(51) Int. Cl.
*G01B 5/004* (2006.01)
(52) U.S. Cl. .............................. 33/549; 33/503; 33/573
(58) Field of Classification Search .................. 33/549, 33/503, 555, 573
See application file for complete search history.

(56) References Cited

U.S. PATENT DOCUMENTS

| | | | |
|---|---|---|---|
| 2,811,781 A | 11/1957 | Johnson et al. | |
| 3,483,626 A * | 12/1969 | Huttel | .......................... 33/549 |
| 4,807,152 A * | 2/1989 | Lane et al. | .................. 700/247 |
| 5,646,732 A * | 7/1997 | Gerlach | ....................... 356/616 |
| 6,564,466 B2 * | 5/2003 | Uwai | .............................. 33/549 |
| 2002/0000047 A1 * | 1/2002 | Yoda et al. | ..................... 33/503 |
| 2004/0134083 A1 * | 7/2004 | Ruijl | ............................ 33/503 |
| 2005/0132591 A1 * | 6/2005 | Kojima et al. | ................. 33/503 |
| 2005/0204571 A1 * | 9/2005 | Mies et al. | ..................... 33/503 |
| 2006/0090361 A1 * | 5/2006 | Matsuda et al. | ............... 33/503 |
| 2009/0031572 A1 * | 2/2009 | Boesser et al. | ................ 33/503 |

FOREIGN PATENT DOCUMENTS

| | | |
|---|---|---|
| DE | 9007815 U1 | 2/1997 |
| DE | 10 2005 058 504 B3 | 5/2007 |
| GB | 2008764 A | 6/1979 |

* cited by examiner

*Primary Examiner*—Christopher W Fulton
(74) *Attorney, Agent, or Firm*—McCormick, Paulding & Huber LLP

(57) ABSTRACT

A measuring apparatus for measuring a workpiece (2), comprising a turntable (1) for receiving the workpiece (2), a base plate (3) with a turntable bearing, and a foundation (12) on which the base plate (3) rests. The turntable (1) comprises a vertical shaft (W) which is situated beneath the turntable (1) and is held by means of the turntable bearing in the base plate (3). The turntable baring comprises an axial bearing (9) at a bottom face end (13) of the shaft (W) which is spaced from the turntable (1). The shaft (W) is rotatably held on the axial bearing in such a way that the weight (G) of the workpiece (2), when received by the turntable (1), is introduced into the foundation (12) through the turntable (1), the shaft (W) and the axial bearing (9).

17 Claims, 4 Drawing Sheets

MEASURING APPARATUS FOR HEAVY WORKPIECES AND WORKPIECE RECEIVER FOR SUCH A MEASURING APPARATUS

CROSS REFERENCE TO RELATED APPLICATION

This application claims the benefit of European Application No. 07 119 171.2, filed Oct. 24, 2007, the disclosure of which is herein incorporated by reference in its entirety.

FIELD OF THE INVENTION

The invention relates to a measuring apparatus for measuring heavy workpieces and a workpiece receiver for use in such a measuring apparatus.

BACKGROUND OF THE INVENTION

There are measuring apparatuses which are used to measure the geometry, properties and other aspects of workpieces by means of measuring probes. Such measuring apparatuses are frequently used for measuring gearwheels and similar workpieces.

It is relevant in such measuring apparatuses to guarantee high measuring precision. Therefore, a respective amount of work is invested in order to design all relevant components of such measuring apparatuses in such a way that the measuring errors are low.

In order to reach any desired point in the three-dimensional space with the measuring probe, the measuring apparatus should have three or more numerically (CNC) controlled axes.

Different problems arise in connection with large, bulky and very heavy workpieces which do not allow scaling existing measuring apparatuses in a respective manner, like the prior known apparatus as shown in FIG. 1 for example. The weight of the workpieces is especially problematic because a deformation of the machine bed or the measuring table may occur in conventional measuring apparatuses when the same is not provided with sufficient stiffness for example. This deformation leads to imprecision in the measurement which cannot be tolerated.

A portal-type measuring apparatus is known from the German patent specification DE 10 2005 058 504 B3 which comprises a measuring probe which can be moved in all spatial directions of a Cartesian system of coordinates. The object to be measured rests on a table which stands on a foundation or base by means of several special feet. The measuring probe is moved by means of a portal-like frame over the object and along the table. By vertically lowering the measuring probe, the object can be scanned from above. This patent specification offers a solution which allows reducing the influence of weight on the positional and measuring precision.

It is a disadvantage of this arrangement however that as a result of the clearance height of the portal-like frame the maximum height of the object to be measured is limited as also the width by the clearance width. Moreover, there are numerous workpieces which, as a result of their geometry, cannot be measured on such a portal-type measuring apparatus in the horizontal position or can only be measured within limits. Furthermore, the described portal-type measuring apparatus comes with the disadvantage that the vertical adjustability which is promoted as a relevant feature will no longer work or work only within limits in the case of workpieces of high weight.

It is a further disadvantage of this solution that the amount of work or distance for displacement of the measuring probe is relatively large and thus the measuring duration is long when rotationally symmetrical workpieces (such as gearwheels for example) need to be measured.

It is therefore an object of the invention to provide a measuring apparatus and a novel workpiece receiver which allows measuring large and especially heavy workpieces in a rapid and reliable way without the weight of the workpiece having a negative influence on the measuring precision.

Moreover, the apparatus shall be inexpensive to produce and still measure in a highly precise manner.

SUMMARY OF THE INVENTION

A measuring apparatus for measuring a workpiece is provided accordingly in accordance with the invention which comprises a turntable for receiving the workpiece, a base plate with turntable bearing and a foundation on which the base plate rests. In accordance with the invention, the turntable comprises a vertical shaft which is disposed beneath the turntable and is held by means of the turntable bearing in the base plate. The turntable bearing comprises an axial thrust bearing. A bottom face end of the shaft which is spaced from the turntable is rotatably held on the axial thrust bearing in such a way that the weight of the workpiece, when it is received on the turntable, is introduced into the foundation through the turntable, the shaft and the axial thrust bearing.

Moreover, a respective workpiece receiver for installation in a measuring apparatus is provided in accordance with the invention. The workpiece receiver is being characterized by a turntable comprises a vertical shaft which is situated beneath the turntable in the mounted state of the workpiece receiver. The turntable comprises a radial bearing through which the shaft passes, and an axial bearing which is arranged on the face side beneath a bottom face end of the shaft, and is spaced from the turntable.

Advantageous embodiments of the measuring apparatus in accordance with the invention, and the respective workpiece receiver respectively, are also described.

BRIEF DESCRIPTION OF THE DRAWINGS

Embodiments of the invention are described below by reference to the drawings, wherein.

DETAILED DESCRIPTION OF THE PREFERRED EMBODIMENTS

Figure 1:
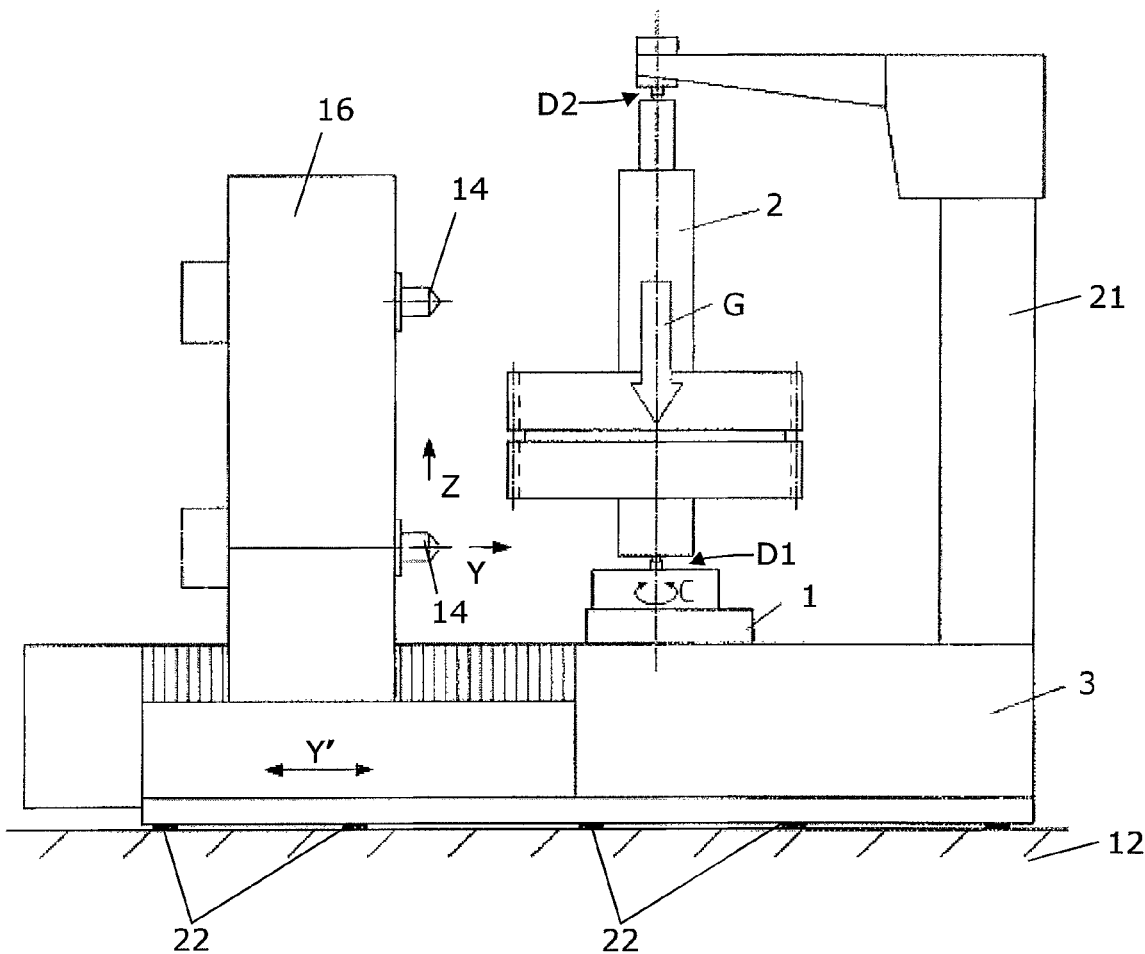
FIG. 1 shows a schematic representation of a known measuring apparatus.

Terms will be used in connection with the present description which are also used in relevant standards. Notice shall be taken however that the use of such terms shall merely serve for purposes of better understanding. The inventive idea and the scope of protection of the claims shall not be limited in interpretation by specific choice of the terms. The invention may be generally transferred to other systems of terms and/or specialist fields. In other specialist fields, such terms shall be applied mutatis mutandis.

As already mentioned above, the invention deals with the measurement of large and heavy workpieces. In particular, it concerns the measurement of turned workpieces (e.g. shafts) or gearwheels. The apparatus in accordance with the invention is especially suitable for large-modul gearwheels as are used in shipbuilding, power plants and industrial plants. The examples as described below concentrate on the measurement of gearwheels, with this not being understood in any way as a limitation on the scope of protection.

The term "measuring" is used in order to describe the measurement or determination of the geometry, position and other aspects of a workpiece. This term shall generally comprise any kind of acquisition of measuring variables by means of a sensing, sampling or scanning head, with the probes working in a mechanical, optical, capacitive and/or inductive way for example.

Before details of the invention are described, the relevant elements of a prior known measuring apparatus 100 are explained by reference to FIG. 1. A part of such elements can also be used in the apparatus 100 in accordance with the invention.

The measuring apparatus 100 comprises a machine bed which is designated in the following as a base plate 3. The base plate 3 concerns a kind of a support element or frame (e.g. in the form of a cast element) which supports the relevant parts of measuring apparatus 100. A vertical measuring tower 16 with a measuring probe 14 can be provided on the base plate 3 (it is also possible that two measuring probes 14 are provided). The measuring tower 16 can be moved in the Y' direction for example along the base plate 3 in order to thus reduce the distance to a workpiece 2 which is to be measured. The measuring probe 14 (in FIG. 1 said measuring probe 14 is shown in two positions) can also be advanced individually, such that it is extended or retracted parallel to the Y direction (which extends parallel to the Y' direction).

The workpiece 2, which in the illustrated example is a cylinder wheel with a shaft, is held perpendicularly on a rotatable table which is called turntable 1. Preferably, a bottom mandrel D1 and an upper mandrel D2 (also known as tail center) are used in order to clamp the workpiece 2. A respective lateral arm 21 can be provided in order to enable the clamping of the workpiece 2. A respective lateral arm 21 can be provided in order to enable the clamping of workpiece 2. The distance between the mandrels D1 and D2 can be set. The base plate 3 plus all superstructures rests with several feet 22 on a foundation 12.

Figure 2:
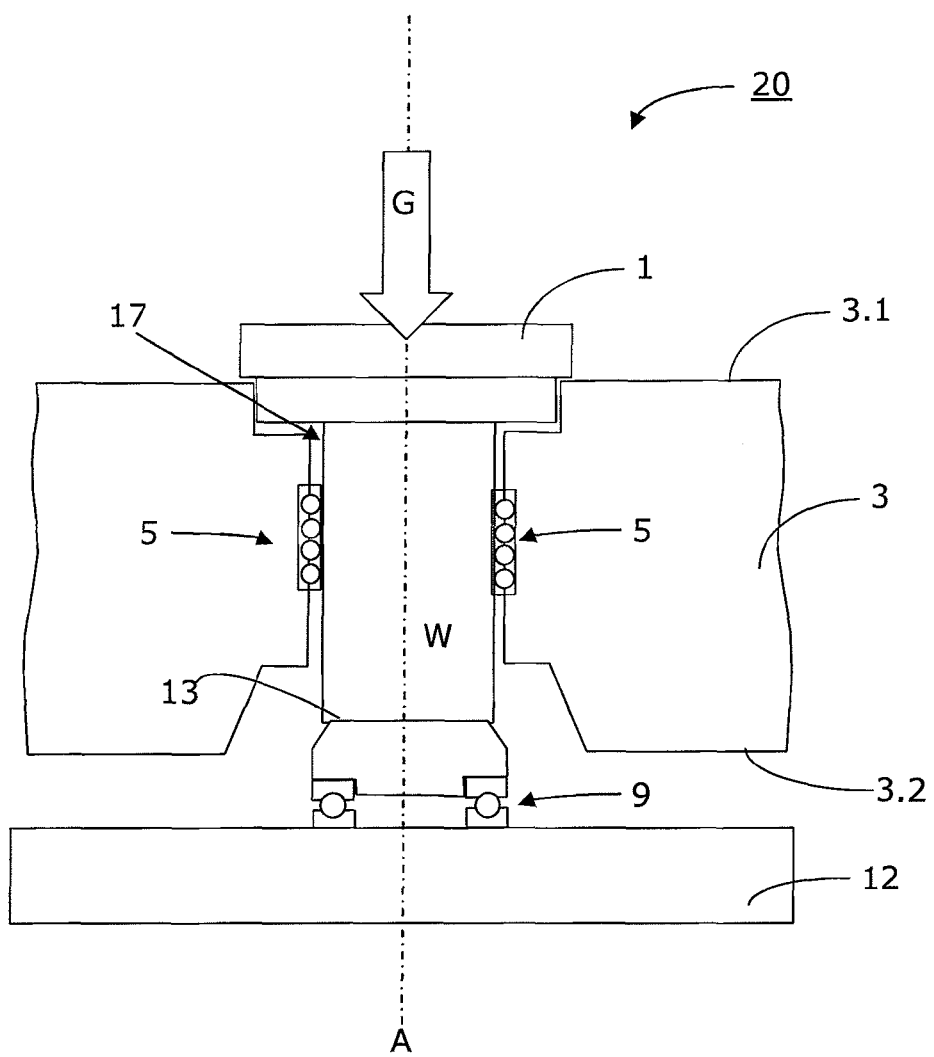
FIG. 2 shows a schematic representation of a workpiece receiver in accordance with the invention.

FIG. 2 now shows a highly schematic illustration of a first embodiment of the invention. A simplified sectional view of a novel base plate 3 is shown which comprises a vertical pass-through opening 17. Said pass-through opening 17 extends from the upper side 3.1 to the bottom side 3.2 of the base plate 3. It preferably concerns a rotationally symmetrical pass-through opening 17 (rotationally symmetrical with respect to the rotational axis A). A turntable 1 (which is also known as a rotary table) is inserted into pass-through opening 17 and comprises a substructure which will be described below. The substructure comprises a shaft W which is fastened to the turntable 1 or is an integral part of turntable 1. Said shaft W is held in the radial direction by a radial bearing 5. Shaft W extends centrally through the radial bearing 5. The bottom face end 13 of the shaft W sits on an axial bearing 9 or opens into an axial bearing 9. Said axial bearing 9 is dimensioned and arranged in such a way that forces acting in the axial direction (e.g. the weight G of the workpiece 2) are taken up by the axial bearing 9. On the bottom side, the axial bearing 9 is supported accordingly with respect to the foundation 12. Said support occurs in accordance with the invention in such a way that either the entire weight (which is the case in the embodiment shown in FIG. 2) or a major part of the weight (which is the case in the embodiment shown in FIG. 3) is introduced into the foundation 12. In a vertical direction (i.e. parallel to the rotational axis A), the turntable 1 can be slightly moved or displaced together with shaft W, i.e. the shaft W of the turntable 1 is held vertically in a free-floating manner.

In the illustrated embodiment there is no mechanical connection (therefore the designation free-floating) between the turntable 1 with the substructure and the base plate 3. Merely the frictional forces which act in the area of the radial bearing 5 on shaft W ensure a slight mechanical coupling of the two areas. In other words, the turntable 1 can be moved upwardly or downwardly with the substructure nearly independent from the base plate 3 or the base plate 3 can be moved upwardly or downwardly without moving the turntable 1 with the substructure simultaneously.

Figure 4:
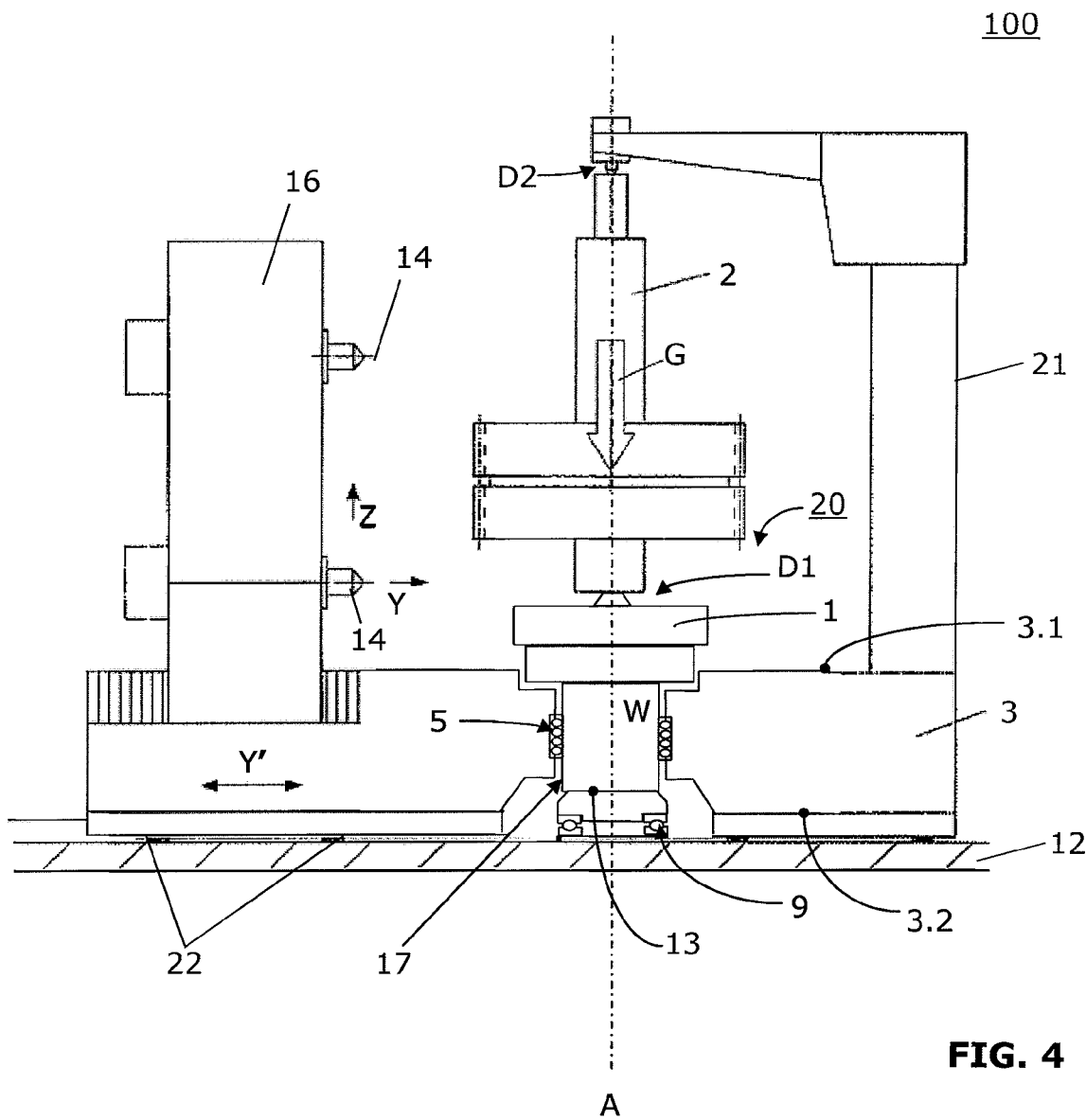
FIG. 4 shows a schematic representation of a measuring apparatus in accordance with the invention with a workpiece receiver according to FIG. 2.

In order to define the measuring apparatus 100 in its entirety in its position, the base plate 3 can rest with respective feet 22 or blocks on the foundation 12, as is shown in FIG. 4 for example.

When for instance a heavy workpiece 2 is clamped on the turntable 1 (e.g. between the two mandrels D1 and D2, as shown in FIGS. 1 and 4), the entire weight G of the workpiece 2 is conducted via shaft W and the axial bearing 9 into the foundation 12. As a result of the floating bearing, there is no bending/deformation or other influencing of the base plate 3, which means there is also no offset or any other influence on the very sensitive 3D measuring arrangement (e.g. on measuring tower 16 with the measuring probe 14 or with two measuring probes).

Figure 3:
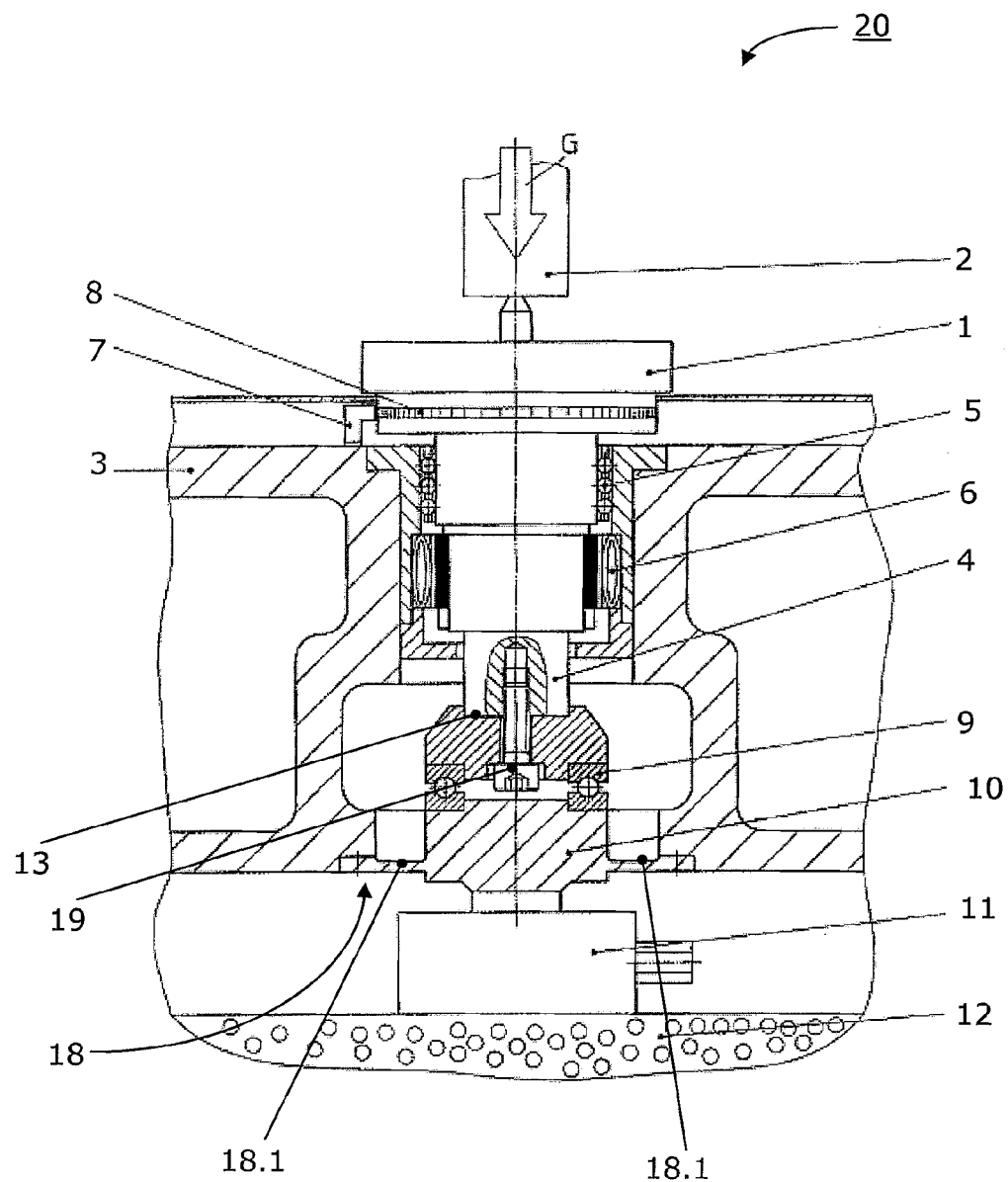
FIG. 3 shows a schematic representation of a further workpiece receiver in accordance with the invention.

A presently preferred embodiment of the invention is shown in FIG. 3. In contrast to the first embodiment of the invention, the turntable 1 with the substructure is held here in a floating manner. This floating bearing is achieved in such a way that a respectively flexible bearing 18 is provided. Said flexible bearing 18 is arranged in such a way that the turntable 1 with the substructure is supported completely by the base plate 3 or is held in the same. When a heavy weight G is placed or clamped on the turntable 1, the flexible bearing 18 allows a slight sagging or downward displacement of the shaft W plus the axial bearing 9 located at its face side 13.

In order to enable this, the following components of the workpiece receiver are provided (seen from the top to the bottom). A turntable 1 is provided, as in FIG. 2. Beneath said turntable 1 there is a shaft W which is fastened to the turntable 1 or is an integral part of said turntable 1. Said shaft W is held in the radial direction by a radial bearing 5. Shaft W extends in the middle through the radial bearing 5. The bottom face end 13 of shaft W sits in an axial bearing 9 or ends into an axial bearing 9. Said axial bearing 9 is dimensioned and arranged in such a way that forces acting in the axial direction (e.g. the weight G of workpiece 2) are taken up by the axial bearing 9. On the bottom side, the axial bearing 9 is received accordingly by a (receiving) flange 10. The flange 10 on its part rests on the foundation 12 or a so-called foundation base 11, as shown in FIG. 3. In the first case, the flange 11 transmits the weight directly onto foundation 12 and in the second case the weight is transmitted indirectly via the foundation base 11 onto the foundation 12.

The flange 10 is arranged in a constructional respect in such a way that it is used as a flexible bearing 18. A certain flexibility is present in the axial direction. Said flexibility is obtained in the illustrated embodiment by the thin and flexible (membrane-like) webs 18.1. As a result of this flexible bearing 18, which is referred to herein as floating bearing, it is ensured that a major part of the weight G is introduced directly or indirectly into the foundation 12. Only a negligible small amount of the weight G is introduced via the webs 18.1 into the bottom area of base plate 3. These forces are so small however that a bending or other influence on the base plate 3 or the 3D measuring arrangement (measuring apparatus 100) does not occur.

The following shows further advantageous details of the embodiment shown in FIG. 3. A motor 6 is preferably provided in order to enable the rotation of turntable 1 plus workpiece 2 about the rotational axis A. In the illustrated example this concerns a servomotor which is arranged concentrically on the shaft W or in a receiving flange of the radial bearing 5. An angular measuring system 7, 8 can optionally be used for triggering the respective CNC control unit of the measuring apparatus 100 and for precise position detection. Preferably, said angular measuring system 7, 8 is disposed directly on or beneath the turntable 1. The angular measuring system 7, 8 can comprise an optical sensor 7 for example which is fastened to the base plate 3. Optically scannable markings 8 are situated opposite of sensor 7 on the turntable 1. When the turntable 1 is rotated, sensor 7 will detect such a rotation.

The axial bearing 9 is preferably screwed together with the bottom face end 13 of shaft W by means of a screwed connection (consisting of a screw 19 with a threaded bore). Screw 19 is fastened in a screw hole/threaded bore in the bottom end region 4 of shaft W.

The mentioned foundation base 11 can sit on or beneath the base plate 3 and rests flat on the foundation 12.

A workpiece receiver 20 in accordance with the invention for installation in a measuring apparatus 100, e.g. a measuring apparatus 100 according to FIG. 4, comprises at least one turntable 1 with a vertical shaft W which in the mounted state of the workpiece receiver 20 is situated beneath the turntable 1. Turntable 1 comprises a radial bearing 5 through which shaft W passes centrally (in the middle). Turntable 1 comprises an axial bearing 9 which is arranged on the face side beneath a bottom face end 13 of shaft W which is spaced from the turntable 1. Radial bearing 5 is arranged for installation in an upper region of a vertical lead-through hole 17 and the axial bearing 9 is arranged for installation in a bottom end region of the vertical lead-through hole 17. Lead-through hole 17 is provided in the machine bed (base plate 3) of the measuring apparatus 100. Axial bearing 9 sits in the bottom end region of the vertical lead-through hole 17 in such a way that in the case of a vertical weight load by weight G of the workpiece 2 the weight G is conducted into a foundation 12 beneath the workpiece receiver 20.

FIG. 4 shows a schematic view of a measuring apparatus 100 in accordance with the invention which comprises a workpiece receiver 20 according to FIG. 2. It may concern a fully automatic CNC-controlled gear measuring station 100 for example. The illustrated measuring apparatus 100 is similar to the apparatus 100 which was already described in connection with FIG. 1. Only the details of this embodiment which are relevant to the invention shall therefore be described below.

The illustration shown in FIG. 4 concerns a schematic illustration in which a part of the elements are shown in a partial sectional view. As already described in connection with FIG. 2, the workpiece receiver 20, which is the turntable 1 with the substructure consisting of shaft W, radial bearing 5 and axial bearing 9, sits in a lead-through opening 17 of the base plate 3 or the machine bed. The base plate 3 rests on several feet 22 or blocks. On the bottom side, axial bearing 9 rests directly (as shown in FIG. 4) or indirectly (as shown in FIG. 3 for example) on foundation 12.

The described method is especially suitable for measuring large-modulus gearwheels such as cylindrical gears, bevel pinion gears and/or ring gears (preferably with a modulus of larger than 12). Measuring stations 100 in accordance with the invention are especially suitable for testing large and heavy cylindrical gearings as well as worms and wormwheels, bevel gears and general deviations in dimensions, shapes and positions in rotationally symmetrical workpieces, and for rotor measurement.

The apparatus 100 in accordance with the invention comes with the advantage that during the measuring of a large-modulus gearwheel a minimal amount of work is required in preparing the setup (clamping) or in correcting or compensating imprecision in the measurement which would arise in conventional measuring apparatuses when heavy workpieces were measured. During this time, a more expensive measuring apparatus would come to a standstill, which is disadvantageous from a financial standpoint.

In order to take up the high weights G of the workpieces, the workpiece receiver 20 has an especially high carrying capacity and is provided with considerable reserves. The permissible testing weight can clearly be over 1000 kg. Depending on the arrangement of the apparatus 100, workpiece weights G of several metric tons (e.g. more than 10 tons) can be measured.

The invention claimed is:

1. Measuring apparatus for measuring a workpiece, comprising
    a turntable for receiving the workpiece,
    a base plate with a turntable bearing, and
    a foundation on which the base plate rests, characterized in that
    the turntable comprises a vertical shaft which is located beneath the turntable and which is held in the base plate by means of the turntable bearing,
    the turntable bearing comprises an axial bearing and a bottom face end of the shaft spaced from the turntable is rotatably held on the axial bearing in such a way that the weight of the workpiece, when it is received by the turntable is conducted into the foundation through the turntable, the shaft and the axial bearing.

2. Measuring apparatus according to claim 1, characterized in that the base plate comprises a vertical lead-through hole which extends from an upper side of the base plate to a bottom side of the base plate which rests on or above the foundation.

3. Measuring apparatus according to claim 1, characterized in that the axial bearing is held in a flexible bearing of the base plate in such a way that in the case of vertical weight load by the weight of the workpiece the weight is introduced into the foundation beneath the measuring apparatus.

4. Measuring apparatus according to claim 3, characterized in that the flexible bearing introduces a small percentage of the weight into the base plate and the remaining percentage of weight into the foundation.

5. Measuring apparatus according to claim 3, characterized in that a flange with flexible webs is used as a flexible bearing.

6. Measuring apparatus according to claim 3, characterized in that the axial bearing is screwed together with the bottom face end of the shaft by means of a screwed joint.

7. Measuring apparatus according to claim 1, characterized in that a foundation base is present on or beneath the base plate which rests in a planar manner on the foundation.

8. Measuring apparatus according to claim 1, characterized in that a bottom clamping mandrel and, vertically spaced above the turntable, an upper clamping mandrel are provided in order to enable receiving the workpiece between said clamping mandrels.

9. Measuring apparatus according to claim 8, characterized in that a vertical rotational axis is defined by the clamping mandrels and the turntable, which axis coincides with a central rotational axis of the shaft and a central rotational axis of the axial bearing.

10. Measuring apparatus according to claim 1, characterized in that a motor is provided for rotating the turntable plus workpiece, with the motor preferably being one that is situated in the base plate.

11. Measuring apparatus according to claim 10, characterized in that the motor concerns a servomotor which is arranged coaxially to the shaft.

12. Measuring apparatus according to claim 1, characterized in that it concerns a coordinate measuring apparatus for measuring large-modulus gearwheels.

13. Workpiece receiver for installation in a measuring apparatus for measuring a workpiece, with the workpiece receiver comprising a turntable for receiving the workpiece, characterized in that the turntable comprises a vertical shaft which is situated beneath the turntable in the mounted state of the workpiece receiver, the turntable comprises a radial bearing through which the shaft passes, the turntable comprises an axial bearing which is arranged on the face side beneath a bottom face end of the shaft which is spaced from the turntable, with the radial bearing being arranged for installation in an upper region of a vertical lead-through hole of a base plate of a measuring apparatus and the axial bearing is arranged for installation in a bottom end region of the vertical lead-through hole and the axial bearing sits in the bottom end region of the vertical lead-through hole in such a way that in the case of vertical weight load by the weight of the workpiece the weight is introduced via the axial bearing into a foundation beneath the workpiece receiver.

14. Workpiece receiver according to claim 13, characterized in that a flexible bearing is provided in the area of the axial bearing in order to enable fastening of the turntable with shaft and axial bearing in a base plate of the measuring apparatus in the area of the lead-through hole.

15. Workpiece receiver according to claim 14, characterized in that a flange with flexible webs is used as a flexible bearing.

16. Workpiece receiver according to claim 13, characterized in that the axial bearing is screwed together with the bottom face end of the shaft by means of a screwed joint.

17. Workpiece receiver according to claim 13, characterized in that a bottom clamping mandrel and, vertically spaced above the turntable, an upper clamping mandrel are provided in order to enable receiving the workpiece between said clamping mandrels.

* * * * *